(12) United States Patent
Larsen et al.

(10) Patent No.: US 8,271,748 B2
(45) Date of Patent: Sep. 18, 2012

(54) GENERATING AND/OR RECEIVING, AT LEAST ONE DATA ACCESS REQUEST

(75) Inventors: Steen K. Larsen, Hillsboro, OR (US); Ramakrishna Huggahalli, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 12/190,267

(22) Filed: Aug. 12, 2008

(65) Prior Publication Data

US 2010/0042579 A1    Feb. 18, 2010

(51) Int. Cl.
*G06F 13/22* (2006.01)
(52) U.S. Cl. ........ 711/158; 711/161; 711/200; 370/225; 370/229; 719/325; 709/223; 709/240
(58) Field of Classification Search .................. 370/225, 370/229; 719/325, 326; 707/655, 999.204; 711/161, 162, 15, 200; 709/223, 240
See application file for complete search history.

(56) References Cited

U.S. PATENT DOCUMENTS

| | | | |
|---|---|---|---|
| 6,665,794 B2 | 12/2003 | Koker et al. | |
| 6,782,435 B2 | 8/2004 | Garcia et al. | |
| 6,968,402 B2 | 11/2005 | Jackson et al. | |
| 7,162,583 B2 | 1/2007 | Adl-Tabatabai et al. | |
| 2006/0036821 A1* | 2/2006 | Frey et al. | 711/162 |
| 2006/0221824 A1* | 10/2006 | Anzai | 370/229 |
| 2007/0016754 A1* | 1/2007 | Testardi | 711/206 |
| 2007/0226435 A1* | 9/2007 | Miller et al. | 711/158 |
| 2007/0248029 A1* | 10/2007 | Merkey et al. | 370/255 |
| 2008/0162735 A1* | 7/2008 | Voigt et al. | 710/6 |
| 2009/0006732 A1* | 1/2009 | Lubbers | 711/110 |

OTHER PUBLICATIONS

"Intel® Itanium® 2 Processor Reference Manual", For Software Development and Optimization, (May 2004),196 pgs.
"Information technology—SCSI Primary Commands—4 (SPC-4)", Project T10/1731-D, Working Draft, (May 14, 2007), 554 pgs.
Satran, J. et al., "Internet Small Computer Systems Interface (iSCSI)", Network Working Group, http://tools.ietf.org/rfc/rfc3720.txt,(Apr. 2004), 328 pgs.
"Information technology—SCSI-3 Architecture Model", X3T10 994D, Draft, (Nov. 27, 1995), 73 pgs.
Cisco Systems, "iSCSI Protocol Concepts and Implementation," White Paper, 2001, pp. 1-12, Cisco Systems, USA.
American National Standard Information Technology, "SCSI-3 Parallel Interface," (draft), 1994, pp. 1-92, X3T10/855D Revision 15, American National Standard of Accredited Standards Committee X3, Englewood, Colorado.

* cited by examiner

*Primary Examiner* — Dennis Truong
(74) *Attorney, Agent, or Firm* — Christopher K. Gagne

(57) ABSTRACT

In an embodiment, an apparatus is provided that may include circuitry to generate, at least in part, and/or receive, at least in part, at least one request to access at least one portion of data. The at least one request may indicate, at least in part, at least one subset of the at least one portion of the data that is of relatively higher importance than one or more other subsets of the at least one portion of the data that are of relatively lower importance. The at least one request may be to request, at least in part, that the at least one subset be accessed prior to the one or more other subsets are accessed. The at least one request may be comprised, at least in part, in at least one packet in accordance with a protocol that permits variable packet size.

10 Claims, 3 Drawing Sheets

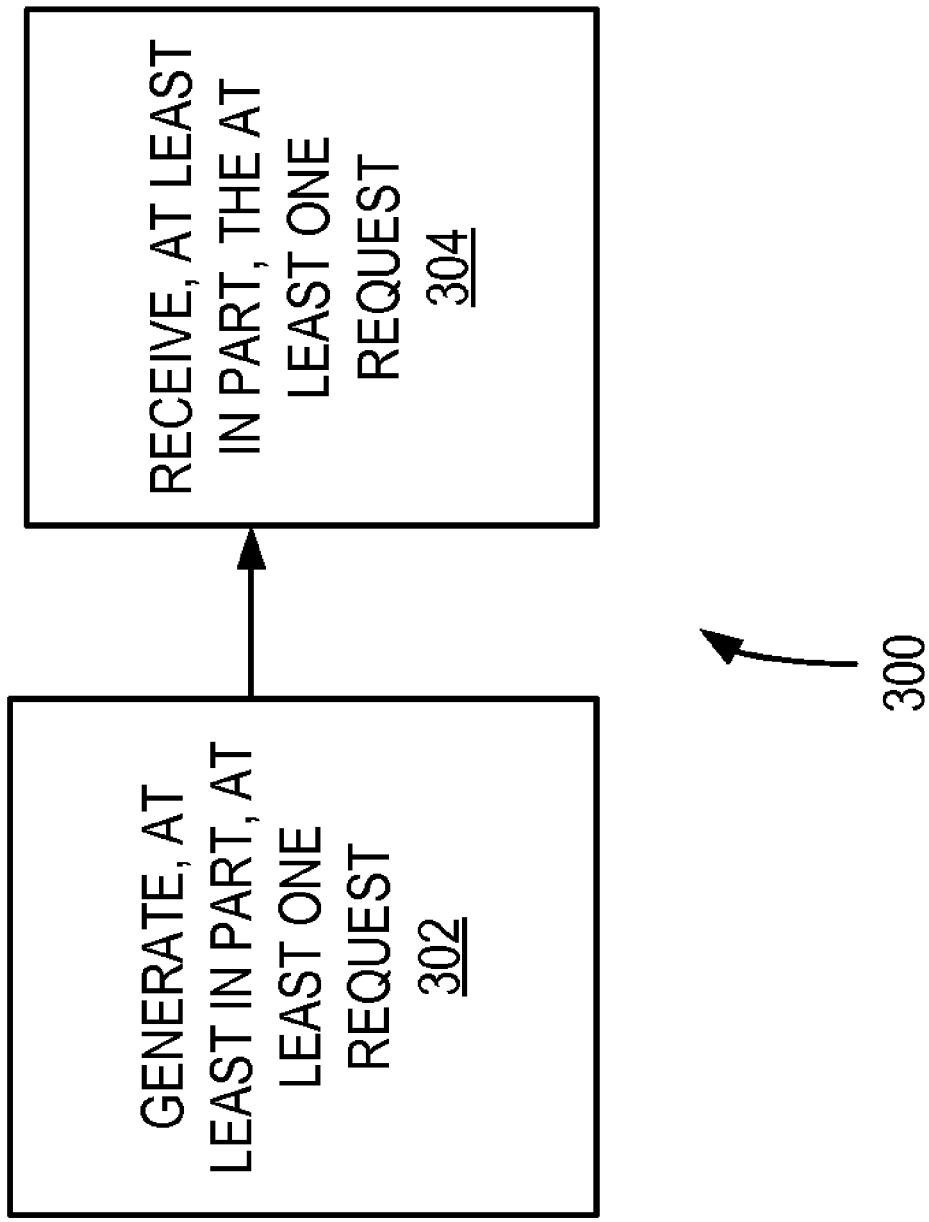

GENERATING AND/OR RECEIVING, AT LEAST ONE DATA ACCESS REQUEST

FIELD

This disclosure relates to generation and/or receipt, at least in part, of at least one data access request.

BACKGROUND

In one conventional storage network a requesting system may issue a request to a storage system to access a block of data stored in the storage system. The size of the block may be predetermined in this arrangement, and the request may indicate the data block to be accessed by specifying in the request the beginning address of the block in the storage system. In this arrangement, the size of the block may be larger than the maximum size that a data payload may have in a frame in accordance with the protocol via which the two systems exchange data and commands. Accordingly, the data block may be fragmented into a sequence of multiple segments, the segments may be placed into respective frames, and the frames may be transmitted in an order that corresponds to the sequence order of the respective segments that the respective frames contain. After being received by the requesting system, the segments may be presented to a program process for processing.

In this conventional arrangement, execution of the program process may stall and/or otherwise be impeded, at least in part, pending receipt of a certain part of the data block, and only receipt of that part may permit the program process to continue its unimpeded execution. Depending upon the size of the data block, this may introduce an undesirable amount of latency in the program process' execution, since a later-received frame may contain this part of the data block.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which:

FIG. 3 illustrates flowchart of operations in an embodiment.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
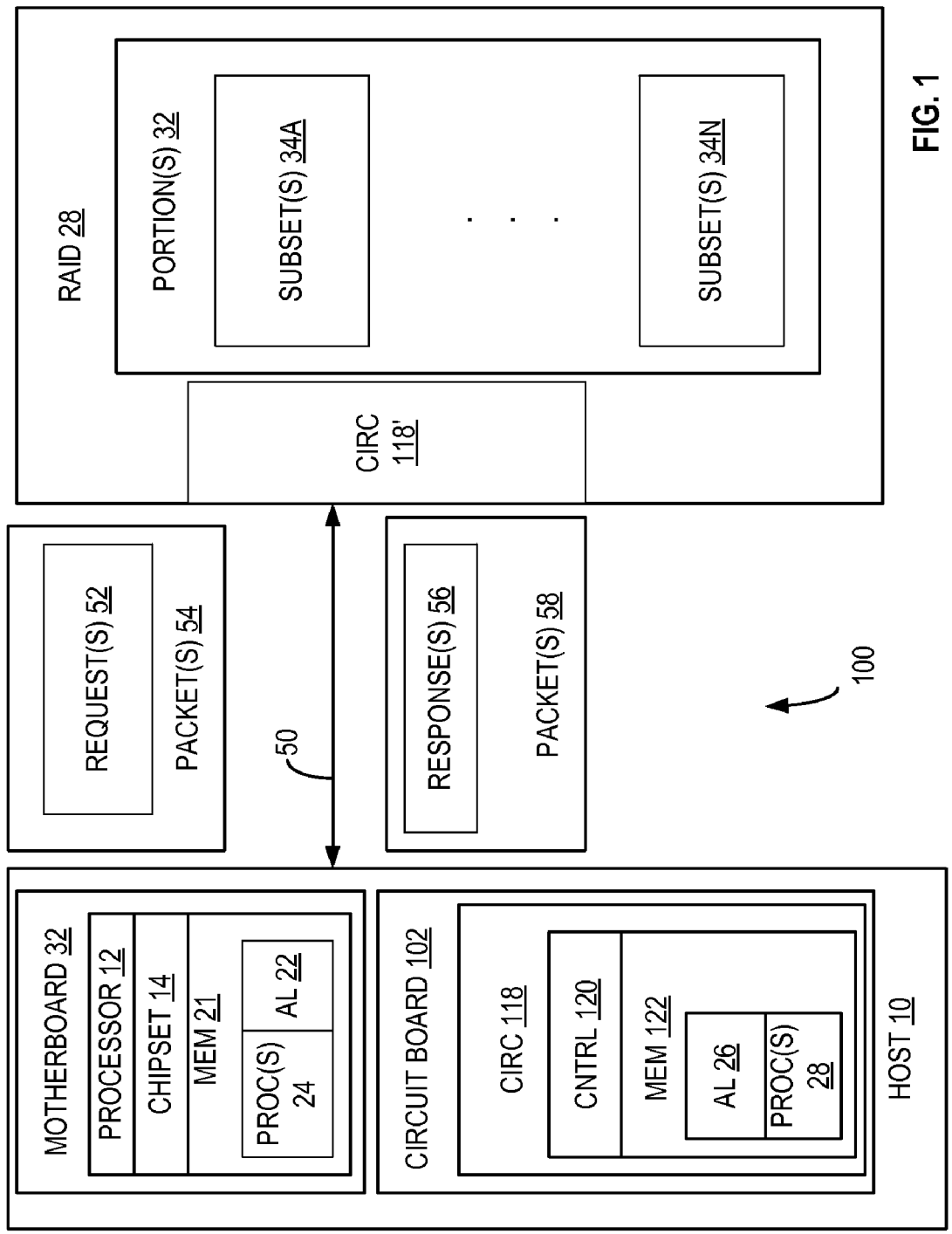
FIG. 1 illustrates a system embodiment.

FIG. 1 illustrates a system embodiment 100. System 100 may include host 10 that may be communicatively coupled via one or more communication links 50 to RAID 28.

In this embodiment, as shown in FIG. 1, host 10 may comprise circuit board 102 and motherboard 32. Motherboard 32 may comprise one or more host processors 12. Each of the host processors 12 may be coupled (e.g., via a respective not shown segment of a proprietary bus) to a chipset 14. Each of the one or more host processors 12 may comprise, for example, a respective Intel® Core™ 2 VPro™ microprocessor that is commercially available from the Assignee of the subject application. As used herein, a "processor" means circuitry capable of performing, at least in part, one or more arithmetic and/or logical operations. Of course, alternatively, each of the host processors 12 may comprise, for example, a respective microprocessor that is manufactured and/or commercially available from a source other than the Assignee of the subject application, without departing from this embodiment.

Chipset 14 may comprise a not shown memory controller hub that may couple one or more host processors 12, a system memory 21 and a not shown user interface system to each other and to a not shown bus system. Chipset 14 may comprise one or more integrated circuit chips selected from, for example, one or more integrated circuit chipsets available from the Assignee of the subject application (e.g., memory controller hub and I/O controller hub chipsets), although one or more other integrated circuit chips may also, or alternatively be used, without departing from this embodiment. The not shown user interface system may comprise, e.g., a keyboard, pointing device, and display system that may permit a human user to input commands to, and monitor the operation of, system 100. The not shown bus system may comprise one or more buses that may comply with the bus protocol described in Peripheral Component Interconnect (PCI) Express™ Base Specification Revision 1.0, published Jul. 22, 2002, available from the PCI Special Interest Group, Portland, Oreg., U.S.A. Alternatively, the bus may comprise other types of bus systems, without departing from this embodiment.

Controller circuit card 102 in host 10 may be communicatively coupled to RAID 28 via links 50, and may control the operation of RAID 28. In this embodiment, RAID 28 may comprise a plurality of not shown mass storage devices. The RAID level that may be implemented by these mass storage devices may be 0, 1, or greater than 1. Depending upon, for example, the RAID level implemented in RAID 28, the number of such mass storage devices may vary so as to permit the number of such mass storage devices to be at least sufficient to implement the RAID level so implemented.

As used herein, the term "storage device" may be used to mean one or more apparatus into, and/or from which, data may be stored and/or retrieved, respectively. Also as used herein, the term "mass storage" may mean a storage device capable of non-volatile storage of data. For example, in this embodiment, mass storage may include, without limitation, one or more non-volatile magnetic, optical, and/or semiconductor storage devices. As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry.

Controller circuit card 102 may comprise operative circuitry 118. Operative circuitry 118 may comprise storage I/O controller 120 and memory 122.

Processors 12, system memory 21, and chipset 14 may be comprised in a single circuit board, such as, for example, system motherboard 32. Motherboard 32 also may comprise the not shown bus system and a not shown bus card slot. Card 102 may include a not shown bus connector that may be capable of being electrically and mechanically coupled to the bus card slot that may be comprised in the motherboard 32. When the bus connector of card 102 is so coupled to the bus card slot comprised in motherboard 32, operative circuitry 118 may become communicatively coupled to mother board 32.

Alternatively, without departing from this embodiment, some or all of the operative circuitry 118 of controller card 102 may not be comprised in card 102, but instead, may be comprised in other structures, systems, and/or devices. These other structures, systems, and/or devices may be, for example, comprised in motherboard 32 (e.g., as part of host processor 12 and/or chipset 14).

One or more machine-readable program instructions may be stored in computer-readable memory 122 and/or 21. In operation of system 100, these instructions may be accessed and executed by controller 120 and/or one or more host processors 12. When executed by controller 120 and/or one or more host processors 12, these one or more instructions may result in controller 120, operative circuitry 118, host processor 12, and/or card 102 performing the operations described herein as being performed by controller 120, operative circuitry 118, host processor 12, and/or card 102. Also when executed by controller 120 and/or one or more host processors 12, these one or more instructions may result in application layer 22 and/or application layer 26 being executed, at least in part, by controller 120, operative circuitry 118, host processor 12. Application layer 22 may comprise one or more application layer program processes 24. Application layer 26 may comprise one or more application layer program processes 28. Computer-readable memory 21 and 122 may each comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable memory.

RAID 28 may comprise operative circuitry 118' whose construction may conform, in whole or in part, the construction of circuitry 118. Circuitry 118' may be communicatively coupled via one or more links 50 to circuit board 102 and circuitry 118. One or more machine-readable program instructions may be stored in computer-readable memory (not shown) in circuitry 118'. In operation of system 100, these instructions may be accessed and executed by a not shown controller in circuitry 118'. When executed by this not shown controller in circuitry 118', these one or more instructions may result in this not shown controller 120 and/or operative circuitry 118' performing the operations described herein as being performed by this not shown controller and/or operative circuitry 118'.

One or more communication links 50 may be compatible with one or more communication protocols, and circuitry 118 in host 10 may exchange data and/or commands with circuitry 118' in RAID 28 via links 50, in accordance with these one or more communication protocols. For example, in this embodiment, one or more links 50 may be compatible with, and the respective operative circuitry 118 may exchange data and/or commands with RAID 28 in accordance with, e.g., an Ethernet protocol, Transmission Control Protocol/Internet Protocol (TCP/IP) protocol, Small Computer Systems Interface (SCSI) protocol, and/or Internet Small Computer Systems Interface (iSCSI) protocol.

The Ethernet protocol utilized in system 100 may comply or be compatible with the protocol described in Institute of Electrical and Electronics Engineers, Inc. (IEEE) Std. 802.3, 2000 Edition, published on Oct. 20, 2000. Alternatively or additionally, the TCP/IP protocol utilized in system 100 may comply or be compatible with the protocols described in Internet Engineering Task Force (IETF) Request For Comments (RFC) 791 and 793, published September 1981. The SCSI protocol that may be utilized in system 100 may be compatible with the protocol described in American National Standards Institute (ANSI) Small Computer Systems Interface-2 (SCSI-2) ANSI X3.131-1994 Specification. The iSCSI protocol that may be utilized in system 100 may be compatible with the protocol described in IETF RFC 3720, published April 2004, and/or other and/or later-developed versions of this protocol. Of course, many different communication protocols may be used for such data and/or command exchange without departing from this embodiment. Indeed, many other and/or additional usage models are possible for and/or in connection with system 100 without departing from this embodiment, such as, for example, without limitation, for and/or in connection with database, query-based, and/or high-performance-computing synchronization, and/or other and/or additional usage models.

Figure 2:
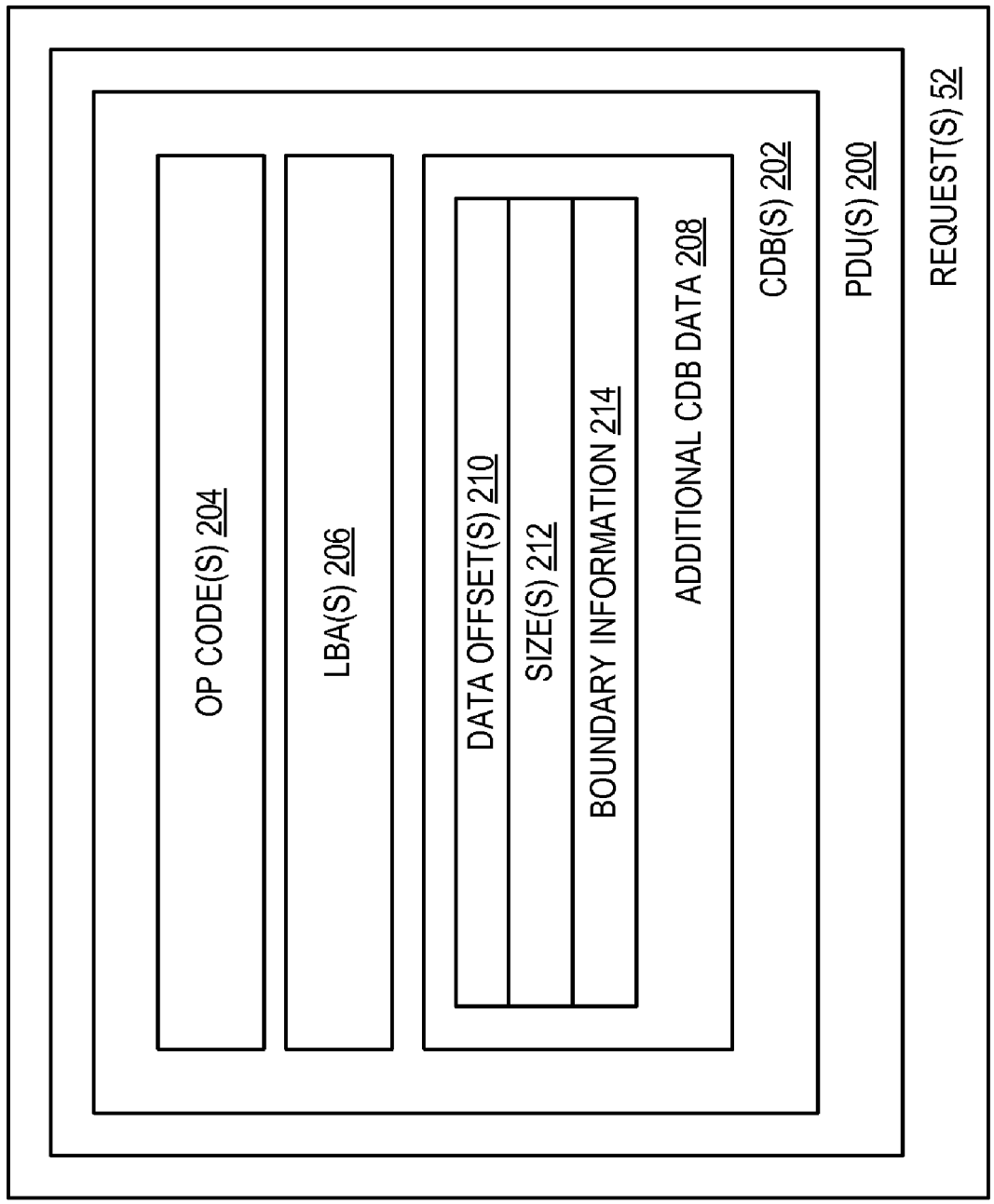
FIG. 2 illustrates a packet according to an embodiment.

With reference now being made to FIGS. 1 to 3, operations 300 that may be performed in system 100 according to an embodiment will be described. After, for example, a reset of system 100, as a result, at least in part, of a request issued by the human user (not shown) to host system 10 via the not shown user interface system to access at least one portion 32 of data and/or at least one subset 34A of data comprised in at least one portion 32 of data, one or more application layer processes 24 at application layer 22 and/or one or more application layer processes 28 at application layer 26 may signal processor 12, controller 120, and/or circuitry 118 (via, e.g., one or more other program processes (not shown) and/or drivers (not shown) in a not shown network protocol stack). This may result, at least in part, in circuitry 118 generating, at least in part, at least one request 52 and at least one packet 54 that comprises the at least one request 52, as illustrated by operation 302 in FIG. 3. Circuitry 118 may issue, at least in part, the at least one packet 54 to circuitry 118' via one or more links 50. As used herein, a "packet" may comprise one or more symbols and/or values. In this embodiment, at least one packet 54 may be in accordance with a protocol that permits variable packet size and/or asynchronous communication, such as, for example, TCP, IP, and/or Ethernet protocol. Also as used herein, "accessing" data may comprise one or more operations that involve and/or manipulate data, such as, for example, reading and/or writing data.

In this embodiment, at least one request 52 may be in accordance, at least in part, with a block-based protocol. For example, at least one request 52 may comprise at least one protocol data unit (PDU) 200 that complies with the iSCSI protocol, and at least one PDU 200 may comprise at least one command data block (CDB) 202 in accordance with the SCSI protocol. In this embodiment, a "block-based protocol" may specify and/or indicate data to be accessed, at least in part, in the form of one or more units of data of predetermined fixed size. CDB 202 may comprise, among other things, one or more op codes 204, one or more logical block addresses (LBA) 206, and one or more additional data fields 208. In this embodiment, one or more op codes 204 may indicate, at least in part, one or more types of accesses (e.g., one or more read operations) being requested by at least one request 52. In this embodiment, one or more LBA 206 may indicate, at least in part, one or more respective beginning logical block addresses of the one or more portions 32 of data whose access is being requested by at least one request 52. Although not shown in Figures, at least one CDB 202 also may comprise transfer length information that may indicate, at least in part, for example, the number of data blocks that are being requested to be accessed by the at least one request 52 (e.g., in this embodiment, the number of blocks comprised in at least one portion 32). Thus, taken together, the values comprised in the above fields of the at least one CDB 202 may indicate, at least in part, the one or more portions 32 of data whose access is being requested by, and the one or more types of accesses being requested by at least one request 52.

Additionally, in this embodiment, at least one CDB 202 may comprise one or more additional CDB data fields 208. One or more data fields 208 may comprise one or more CDB data fields that are reserved in accordance with the SCSI protocol, and/or are otherwise not required to be used (e.g., depending upon the one or more types of operations indicated, at least in part, by one or more op codes 204) in order for one or more CDB 202 to remain compliant and/or compatible with the SCSI protocol. One or more additional CDB data fields 208 may comprise, for example, one or more data offset fields 210, one or more size fields 212, and/or one or more boundary information fields 214.

In this embodiment, one or more subsets 34A of data in portion 32 of data may be of relatively higher importance than one or more other subsets (e.g., one or more subsets 34N) of data in portion 32 that may be of relatively lower importance. For example, one or more processes 24 and/or 28 may stall and/or otherwise be impeded, at least in part, in operation, pending receipt of at least one subset 34A of data in portion 32 of data, and only receipt by these one or more processes 24 and/or 28 of this at least one subset 34A may permit these one or more program processes to continue unimpeded execution. Conversely, one or more processes 24 and/or 28 may not be stalled and/or otherwise impeded in operation pending receipt of one or more other subsets 34N of the data in portion 32 of data. Therefore, at least with respect to permitting one or more processes 24 and/or 28 to continue unimpeded operation, at least one subset 34A of data in portion 32 of data may be of relatively higher importance than one or more other subsets 34N of data in portion 32 of data that may be of relatively lower importance. One or more processes 24 at application layer 22 and/or one or more processes 28 at application layer 26 may be capable of determining, at least in part, this relatively higher importance of the at least one subset 34A of data relative to the relatively lower importance of the one or more subsets 34N. After having made this determination, at least in part, one or more processes 24 at application layer 22 and/or one or more processes 28 at application layer 26 may indicate, at least in part, in one or more additional CDB data fields 208 the at least one subset 34A of data that may be of relatively higher importance relative to the one or more other subsets 34N of the data that may be of relatively lower importance.

For example, one or more offset fields 210 in one or more additional CDB data fields 208 may comprise, at least in part, one or more respective address offsets (e.g., relative to the one or more LBA 206) to the one or more starting addresses of the at least one subset 34A of data. Additionally, in this embodiment, one or more respective sizes (e.g., in bytes, blocks, etc.) of the at least one subset 34A of data may be indicated, at least in part, in one or size fields 212 in one or more additional data fields 208. Additionally or alternatively, one or more additional CDB data fields 208 may comprise one or more respective boundary information fields 214 that may indicate, at least in part, one or more partial byte and/or block offsets within one or more respective bytes and/or blocks (relative to one or more LBA 206 and/or the one or more address offsets in one or more fields 210) at which one or more respective starting addresses of the at least one subset 34A of the data may be. In this embodiment, one or more processes 24 and/or 28 may furnish, at least in part, in one or more of the fields 210, 212, and/or 214 that may be comprised in one or more fields 208 one or more appropriate values to indicate, at least in part, the at least one subset 34A of data that may be of relatively higher importance relative to the one or more other subsets 34N of the data that may be of relatively lower importance.

After circuitry 118 has issued, at least in part, at least one packet 54 to circuitry 118', circuitry 118' may receive, at least in part, at least one packet 54, as illustrated by operation 304 in FIG. 3. In this embodiment, circuitry 118' may interpret at least one request 52 comprised in at least one packet 54 as requesting, at least in part, that at least one subset 34A that is indicated, at least in part, by the one or more additional fields 208 as being of relatively higher importance, be accessed prior to one or more other subsets 34N of portion 32 of data of relatively lower importance being accessed. Circuitry 118' may access and/or transmit the data in portion 32 (including, e.g., subsets 34A . . . 34N) in this manner, as requested, at least in part, by at least one request 52.

For example, in this embodiment, if the size of the at least one portion 32 of data that is requested to be accessed, at least in part, by at least one request 52 exceeds the maximum size of data payload that may be comprised in a single packet that may be transmitted from RAID 28 to host 10 in accordance with the one or more protocols with which the one or more links 50 may be compliant and/or compatible, the circuitry 118' may access and segment the data in at least one portion 32 of data into a plurality of data payloads in a plurality of packets, and may transmit these packets to host 10 via one more links 50. However, circuitry 118' may access, segment, and/or transmit the data in at least one portion 32 such that the at least one subset 34A (of relatively higher importance) is accessed, segmented, and transmitted to host 10 prior to at least one other subset 34N (of relatively lower importance) being accessed, segmented, and transmitted to host 10.

For example, in this embodiment, if one or more op codes 204 indicate, at least in part, that at least one request 52 requests one or more read operations involving at least one portion 32 of data, circuitry 118' first may read at least one subset 34A and may place the data comprised in the at least one subset 34A into one or more responses 56 in one or more packets 58, and may issue these one or more packets 58 to host 10 via one or more links 50. The one or more responses 56 may indicate, at least in part, which portion or portions (e.g., address ranges) of the at least one subset 34A are comprised in the one or more packets 58, and the location or locations in which they are located in one or more packets 58. Circuitry 118, one or more processors 12, and/or controller 120 may parse the one or more packets 58 and/or responses 56 to obtain the one or more segments of the at least one subset 34A. One or more processes 24 and/or 28 may validate and reassemble the segments to reconstruct the at least one subset 34A, and thereafter, may utilize the data comprised in the at least one subset 34 as appropriate. Alternatively or additionally, one or more TCP processes (not shown) in host 10 (e.g., in memory 21 and/or 122) may validate and/or reassemble, at least in part, the one or more segments so as to reconstruct, at least in part, the at least one subset 34A.

After one or more packets 58 containing all of the data in at least one subset 34A have been read, segmented into one or more packets 58, and/or transmitted to host 10 from circuitry 118', circuitry 118' may read and segment into one or more additional packets the remainder (including, for example, at least one subset 34N of relatively lower importance) of at least one portion 32, and may transmit these one or more additional packets to host 10. One or more processes 24 and/or 28 may then validate and process this data, as appropriate. Alternatively or additionally, one or more not shown TCP processes in host 10 may validate and/or reassemble, at least in part, from these one or more additional packets this remaining data so as to reconstruct, at least in part, this remaining data for further processing, as appropriate, at least in part, by one or more processes 24 and/or 28.

Alternatively, one or more packets 58 may comprise, at least in part, data from both at least one subset 34A and at least one other part (e.g., at least one subset 34N) of at least one portion 32. In this alternative arrangement, circuitry 118, controller 120, and/or one or more processors 12 may parse the one or more packets 58 to separate the at least one subset 34A from other data from at least one portion 32 that may be comprised in the one or more packets 58, and may present the at least one subset 34A to one or more processes 24 and/or 28 and/or the one or more not shown TCP processes (e.g., for validation and/or further processing by one or more processes 24 and/or 28) prior to presenting to one or more processes 24 and/or 28 (and/or the one or more not shown TCP processes) the other data from at least one portion 32.

Thus, in one embodiment, an apparatus is provided that may include circuitry to generate, at least in part, and/or receive, at least in part, at least one request to access at least one portion of data. The at least one request may indicate, at least in part, at least one subset of the at least one portion of the data that is of relatively higher importance than one or more other subsets of the at least one portion of the data that are of relatively lower importance. The at least one request may be to request, at least in part, that the at least one subset be accessed prior to the one or more other subsets are accessed. The at least one request may be comprised, at least in part, in at least one packet in accordance with a protocol that permits variable packet size. By accessing, in this embodiment, the at least one subset of relatively higher importance prior to accessing the one or more other subsets of relatively lower importance, it may be possible provide to the requester of the data access the at least one subset of relatively higher importance prior to providing to the requester the one or more other subsets of relatively lower importance. Advantageously, in this embodiment, this may permit the requester to receive and process the at least one subset of relatively higher importance prior its receipt of the one or more other subsets of relatively lower importance. Advantageously, this may permit the amount of latency that may be introduced into program process execution to be reduced compared to the prior art.

The terms and expressions employed herein are used as terms of description and not of limitation, and there is no intention, in the use of such terms and expressions, of excluding any equivalents of the features shown and described (or portions thereof), and various modifications are possible. For example, without departing from this embodiment, although not shown in the Figures, host 10 may comprise and/or be coupled to another RAID, and/or RAID 28 may be coupled to and/or be comprised in another host. In this alternate arrangement, the circuitry 118' may be capable of generating and issuing, at least in part, one or more packets 54 to circuitry 118, and/or circuitry 118 may be capable of receiving, at least in part, these one or more packets 54 and/or issuing, at least in part, to circuitry 118' one packets 58. In this alternate arrangement, the one or more portions of data 32 may be comprised in the other RAID instead of being comprised in RAID 28. Many other alternatives, modifications, and variations are possible without departing from this embodiment.

What is claimed is:

1. An apparatus comprising:
   circuitry to at least one of:
      generate, at least in part, at least one request to access at least one portion of data and indicating, at least in part, at least one subset of the at least one portion of the data that is of relatively higher importance than one or more other subsets of the at least one portion of the data that are of relatively lower importance, the at least one request being to request, at least in part, that the at least one subset be accessed prior to the one or more other subsets being accessed, the at least one request being comprised, at least in part, in at least one packet in accordance with a protocol that permits variable packet size, both the at least one portion of the data that is to be accessed and the at least one subset of the at least one portion of the data that is of the relatively higher importance being indicated by one or more values furnished by one or more application layer processes, the one or more application layer processes to furnish the one or more values in one or more command descriptor block (CDB) fields of the at least one request in terms of predetermined fixed size data units in a storage device, the one or more CDB fields including one or more offset fields, one or more size fields, and one or more respective boundary information fields, the one or more offset fields comprising one or more respective address offsets relative to one or more logical block addresses (LBA) to one or more starting addresses of the at least one subset of the at least one portion that is of relatively higher importance, the one or more size fields indicating one or more respective sizes of the at least one subset of the at least one portion that is of relatively higher importance, and the one or more respective boundary offsets indicating one or more partial offsets relative to the one or more LBA, the one or more LBA also being indicated in the one or more CDB fields, the one or more application layer processes to be executed, at least in part, by both a controller comprised in the circuitry and by a host processor, the circuitry being comprised in a circuit card that is to be coupled to a circuit board in a host, the circuit board comprising the host processor, the one or more application layer processes to reside in both the circuit card and the circuit board, the one or more application layer processes being to determine, at least in part, the at least one portion of the data that is of the relatively higher importance and the one or more other subsets of the at least one portion of the data that are of the relatively lower importance, based at least in part upon whether stalling of the one or more application layer processes may occur pending receipt of the at least one portion of the data that is of the relatively higher importance and the one or more other subsets of the at least one portion of the data that are of the relatively lower importance; and
   receive, at least in part, the at least one request.

2. The apparatus of claim 1, further comprising:
   a redundant array of independent disks (RAID) coupled to the circuitry, the RAID being to store the at least one portion of the data.

3. The apparatus of claim 1, wherein:
   the protocol permits asynchronous communication; and
   the at least one request is in accordance, at least in part, with a block-based protocol.

4. The apparatus of claim 1, wherein:
   the protocol comprises an Ethernet protocol;
   the at least one request comprises a Small Computer System Interface (SCSI) CDB in which the at least one subset is indicated, at least in part.

5. The apparatus of claim 4, wherein:
   the CDB includes a data field that comprises at least one offset that indicates, at least in part, the at least one subset.

6. Computer-readable memory storing one or more instructions that when executed by a machine result in execution of operations comprising at least one of:

generating, at least in part, at least one request to access at least one portion of data and indicating, at least in part, at least one subset of the at least one portion of the data that is of relatively higher importance than one or more other subsets of the at least one portion of the data that are of relatively lower importance, the at least one request being to request, at least in part, that the at least one subset be accessed prior to the one or more other subsets being accessed, the at least one request being comprised, at least in part, in at least one packet in accordance with a protocol that permits variable packet size, both the at least one portion of the data that is to be accessed and the at least one subset of the at least one portion of the data that is of the relatively higher importance being indicated by one or more values furnished by one or more application layer processes, the one or more application layer processes to furnish the one or more values in one or more command descriptor block (CDB) fields of the at least one request in terms of predetermined fixed size data units in a storage device, the one or more CDB fields including one or more offset fields, one or more size fields, and one or more respective boundary information fields, the one or more offset fields comprising one or more respective address offsets relative to one or more logical block addresses (LBA) to one or more starting addresses of the at least one subset of the at least one portion that is of relatively higher importance, the one or more size fields indicating one or more respective sizes of the at least one subset of the at least one portion that is of relatively higher importance, and the one or more respective boundary offsets indicating one or more partial offsets relative to the one or more LBA, the one or more LBA also being indicated in the one or more CDB fields, the one or more application layer processes to be executed, at least in part, by both a controller comprised in the circuitry and by a host processor, the circuitry being comprised in a circuit card that is to be coupled to a circuit board in a host, the circuit board comprising the host processor, the one or more application layer processes to reside in both the circuit card and the circuit board, the one or more application layer processes being to determine, at least in part, the at least one portion of the data that is of the relatively higher importance and the one or more other subsets of the at least one portion of the data that are of the relatively lower importance, based at least in part upon whether stalling of the one or more application layer processes may occur pending receipt of the at least one portion of the data that is of the relatively higher importance and the one or more other subsets of the at least one portion of the data that are of the relatively lower importance; and receiving, at least in part, the at least one request.

7. The memory of claim 6, wherein:
the protocol permits asynchronous communication; and
the at least one request is in accordance, at least in part, with a block-based protocol.

8. The memory of claim 6, wherein:
the protocol comprises an Ethernet protocol;
the at least one request comprises a Small Computer System Interface (SCSI) CDB in which the at least one subset is indicated, at least in part.

9. The memory of claim 8, wherein:
the CDB includes a data field that comprises at least one offset to the at least one subset.

10. The memory of claim 9, wherein:
the data field also indicates, at least in part, respective size of the at least one subset.

* * * * *